United States Patent [19]

Schreckendgust et al.

[11] Patent Number: 4,879,734
[45] Date of Patent: Nov. 7, 1989

[54] INSPECTION APPARATUS AND METHOD USING X-RAYS

[75] Inventors: Jay G. Schreckendgust, Victor, N.Y.; James E. Pantelleria; Mark M. Bergeron, both of Pontiac, Mich.

[73] Assignee: X-Ray Industries, Inc., Troy, Mich.

[21] Appl. No.: 939,603

[22] Filed: Dec. 9, 1986

[30] Foreign Application Priority Data

Dec. 9, 1985 [KR] Rep. of Korea ................. 9246/1985

[51] Int. Cl.⁴ .......................................... G01N 23/02
[52] U.S. Cl. ......................................... 378/57; 378/99
[58] Field of Search ................. 378/51, 57, 58, 99; 358/111

[56] References Cited

U.S. PATENT DOCUMENTS

| 3,580,997 | 5/1971 | Webb et al. | 178/6.8 |
| 3,917,947 | 11/1974 | Fenton | 378/57 |
| 3,924,064 | 12/1975 | Nomura et al. | 178/6.8 |
| 3,958,078 | 5/1976 | Fowler et al. | 178/6.8 |
| 4,159,771 | 2/1979 | Dennhoven et al. | 378/57 |
| 4,163,991 | 8/1979 | Burrig | 358/111 |
| 4,415,980 | 11/1983 | Buchanan | 378/58 |
| 4,442,537 | 4/1984 | Haendle | 378/99 |
| 4,612,572 | 9/1986 | Komatsu et al. | 378/99 |

Primary Examiner—Janice A. Howell
Assistant Examiner—Joseph A. Hunds
Attorney, Agent, or Firm—Dykema Gossett

[57] ABSTRACT

An X-ray inspection apparatus and method allow inspection of the contents of containers moving rapidly past an inspection station. The system includes an X-ray source pulsed by power line voltage, an image amplifier for converting an X-ray image of the container contents to a visible image and a solid state camera for converting the visible image into video signals which are processed by a computer controlled image processor. Clear images are produced of the contents of rapidly moving containers by simultaneously pulsing the X-ray source, the image amplifier and the camera. Image quality is enhanced by synchronizing the exposure of the camera with a portion of the interval in which a visible X-ray image is produced. Control logic and a reject mechanism eject containers having foreign contaminants.

15 Claims, 2 Drawing Sheets

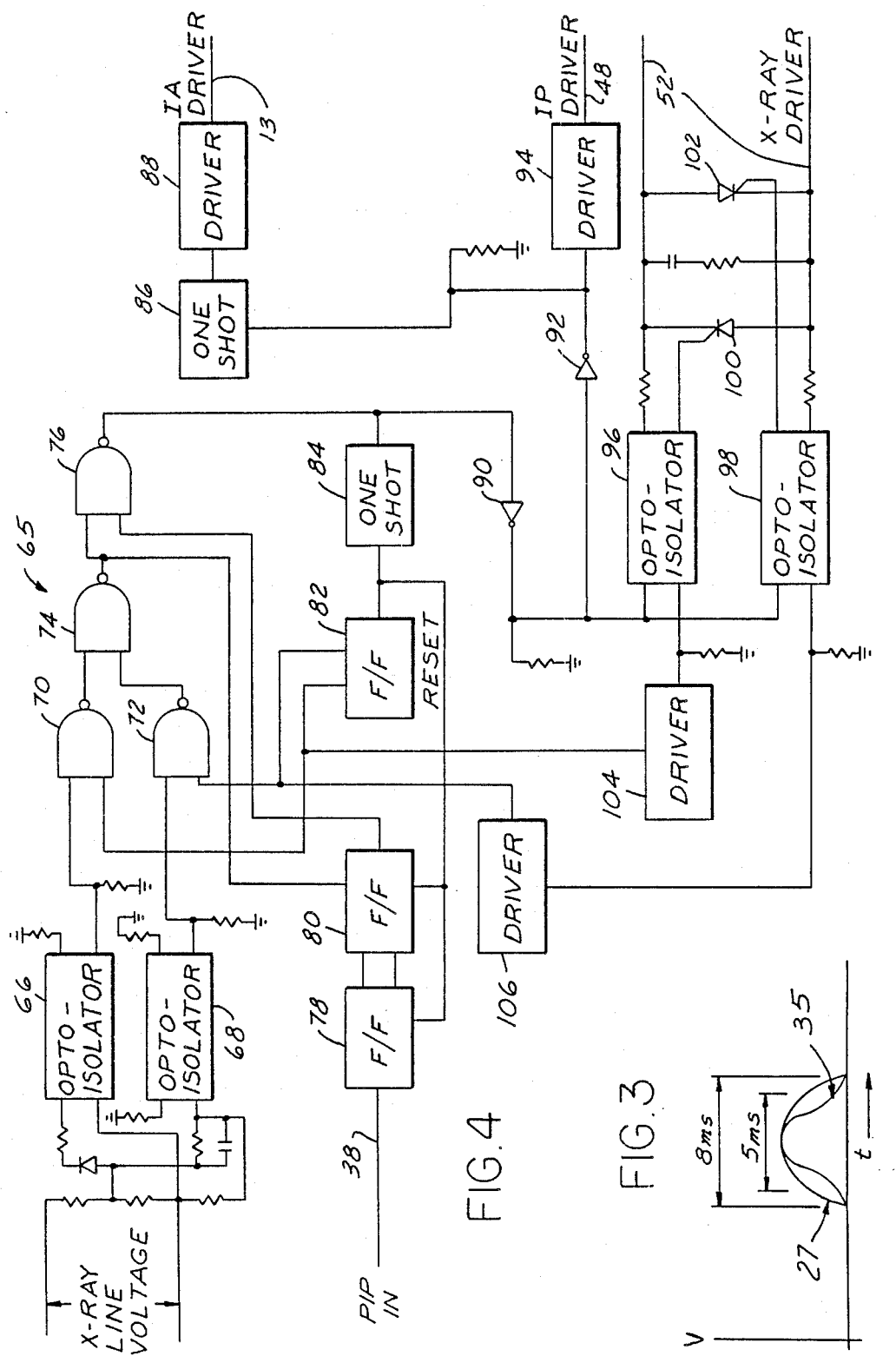

INSPECTION APPARATUS AND METHOD USING X-RAYS

TECHNICAL FIELD

The present invention generally relates to X-ray inspection systems, and deals more particularly with a method and apparatus for inspecting the contents of containers moving rapidly through an inspection station.

BACKGROUND ART

Various types of methods and apparatus have been devised in the past for the purpose of inspecting the contents of containers while the containers are in movement. Such systems typically include means such as a conveyor for moving the containers along a path and an inspection station where the contents of each container are inspected using X-ray techniques. One application of such a system is shown in U.S. Pat. No. 3,924,064 issued Dec. 2, 1985 which discloses the use of X-ray inspection equipment for the purpose of inspecting the contents of luggage and baggage.

X-ray inspection systems of the type described above are also well known for use in connection with automatic production line inspection. For example, U.S. Pat. No. 3,958,078 issued May 18, 1986 discloses an X-ray inspection method and apparatus for inspecting the contents of containers such as glass jars filled with food products, in which an X-ray image is scanned to provide video signals that are processed in a manner which allows detection of very small foreign particles, and without the need for precisely positioning the container at the inspection station. The system disclosed in this prior patent employs a pulsed X-ray source and real time processing which is synchronized to the power line frequency (60 Hz). An X-ray source is pulsed when the presence of a container is detected at the inspection station by a sensor. The resulting X-ray image is processed by an image intensifier which forms a visible image that is converted to a video signal by a camera. The video signal is then analyzed to detect foreign particles or defects in the contents of the container.

Known systems of the type described in the patents mentioned above are limited in their ability to provide container content analysis where the containers are moving at very high speeds through an inspection station, as in a production environment. This limitation is a result of the fact that the resulting X-ray image which is recorded becomes blurred due to rapid movement of the containers. For example, in connection with the container food processing industry, production line rates of between 900 and 1200 or more jars per minute are typical. In other words approximately 900 to 1200 jars move past an inspection station each minute. Heretofore, it has not been possible to examine the food contents of these jars for foreign particles on a continuous basis at these production rates. Thus, in the past, it was necessary to employ off line lot sampling techniques to inspect the contents of food containers. Such techniques are, of course, less than completely desirable since foreign particles representing serious health risks may be introduced into those containers that are not inspected.

The present invention overcomes the shortcomings of the prior art discussed above.

SUMMARY OF THE INVENTION

According to one aspect of the invention, apparatus is provided for inspecting the contents of each of a plurality of containers moving through an inspection station. X-ray pulse generation means are provided at the inspection station which direct pulses of X-rays through a container, thereby resulting in the production of an X-ray image of the contents of the container. Means in the nature of an image intensifier are provided at the inspection station for amplifying the resulting X-ray image. A camera is employed to record the amplified X-ray image as a set of image data. An image processor automatically analyzes the image data to ascertain the contents of the container. The X-ray pulse generation means, the image amplifier and the camera are actuated in synchronism with each other by control pulses generated by control logic. The synchronizing pulses are issued by the control logic in response to a control part-in-place signal generated by a sensor which detects the precise location of each container at an inspection position at the inspection station. The X-ray source includes a full wave rectified alternating output The clarity of the image recorded by the camera is increased by exposing the camera to the amplified X-ray image during only a peak portion of each half wave segment of the output of the image amplifier. The X-ray pulse generation means is powered by a standard alternating current source and the control logic includes means for sensing the instantaneous polarity of the alternating current source and for generating the synchronizing pulses in accordance with the sensed polarity of the alternating current source. The polarity sensing means includes means for producing first and second clock signals which are respectively associated with the positive and negative polarities of the alternating current source, along with means for selecting one of the two clock signals.

In accordance with another aspect of the invention, a method is provided for inspecting the contents of each of a plurality of containers moving through an inspection station, which comprises the steps of sensing the exact location of a container at the inspection station, applying a pulse of·X-rays to the container to produce an X-ray image of the contents of the container when the presence of the container is sensed at the inspection station, pulsing an X-ray image amplifier to amplify the X-ray image in synchronism with the applied X-ray pulse, generating in synchronism with the pulses, a set of image data representing the amplified X-ray image, and analyzing the image data to ascertain the contents of the container.

The method and apparatus of the present invention are particularly well suited to inspecting the contents of containers which move rapidly past an inspection station, for example at rates in excess of 900 containers per minute.

It is therefore the primary object of the invention to provide a method and apparatus for inspecting the contents of containers moving past an inspection station at high rates of speed.

A further object of the invention is to provide a method and apparatus as described above which allows automatic analysis of the contents of each container in order to detect foreign particles or defects in the contents.

Another object of the invention is to provide a method and apparatus as described above which results in the generation of an X-ray image of high resolution in spite of the fact that the containers are moving rapidly through the inspection station.

A further object of the invention is to provide a method and apparatus as described above which are highly suited to production line environments allowing 100 percent inspection of containers moving along a production line, and without the need for human intervention.

A further object of the invention is to provide a method and apparatus as described above which is simple in design and allows the inspection process to performed fully automatically.

These, and further objects of the invention will be made clear or will become apparent during the course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical components in the various views:

FIGS. 2A-2F are timing diagrams of various electrical control signals employed in the system shown in FIG. 1, wherein FIG. 2A is the AC line current, FIG. 2B is the part-in-place signal, FIG. 2C is the X-ray control pulse, FIG. 2D is the image amplifier control pulse, FIG. 2E is the image processor control pulse and FIG. 2F are the video vertical synchronizing pulses;

FIG. 3 is a waveform plot of the output of the image amplifier; and,

FIG. 4 is a combined block and detailed schematic diagram of the control logic for the system shown in FIG. 1.

DETAILED DESCRIPTION OF THE PREFERRED EMBODIMENT

Figure 1:
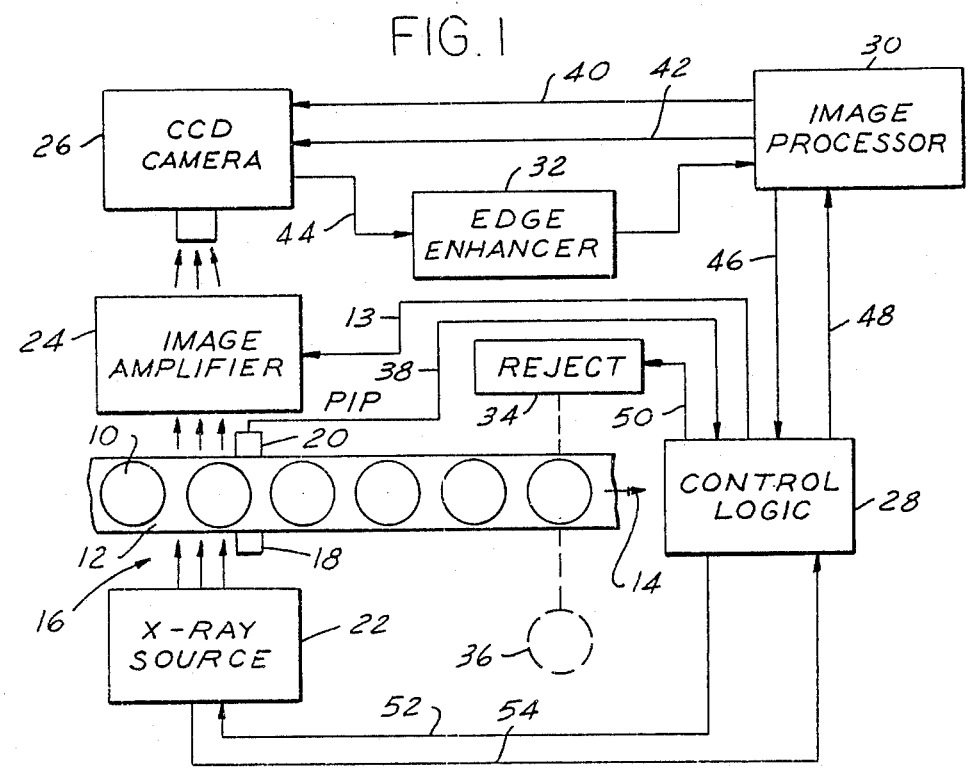
FIG. 1 is a combined block and diagrammatic view of an X-ray inspection system which forms the preferred embodiment of the present invention.

Referring first to FIGS. 1 and 2, the present invention generally relates to a device implemented method for inspecting each of a plurality of containers 10 moving along a path past an inspection station generally indicated by the numeral 16. The containers 10 are moved by a conveyor 12 or the like in the direction of the arrow 14. The containers 10 may comprise, by way of example, glass jars filled with food products which must be inspected for foreign particles. The method and apparatus of the present invention are well suited to inspecting containers 10 which move through the inspection station 16 at very high rates of speed, e.g. in excess of 1200 containers per minute.

Figure 2A:
Figure 2B:
Figure 2C:
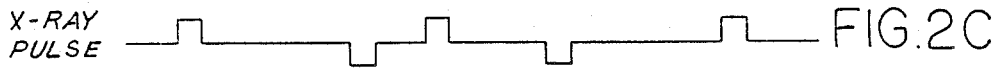

The system broadly includes an X-ray source 22, an image amplifier 24, a camera 26, control logic 28, and an image processor 30. The X-ray source 22 and image amplifier 24 are positioned on opposite sides of the path of travel of the containers 10 such that Xrays from the X-ray source 22 which irradiate the container 10 result in an X-ray image which is received by the image amplifier 24. The X-ray source 22 may be of a conventional type such as that available for the X-cel Corporation and designated by the model "Ureka". The X-ray source 22 is a full wave rectified AC type with a pulsed output and therefore has a relatively low duty cycle. As will be discussed later in more detail, the X-ray source 22 is pulsed in response to a control signal
delivered from the control logic 28 on line 52. This control pulse is shown in FIG. 2C.

The control logic 28 generates the X-ray control pulse on line 52 in response to a part-in-place (PIP) control signal received on line 38 from a photosensor 20. The photosensor 20 is positioned on one side of the conveyor 12 opposite a light source 18. The light source 18 delivers a beam of light to the photosensor 20, which beam is interrupted as a result of the containers 10 passing therethrough. The light source 18 and photosensor 20 are of a conventional type well known in the art.

Figure 2D:
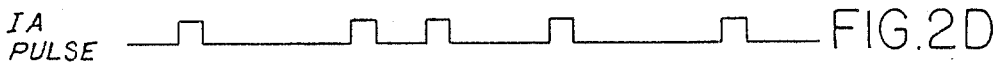

The image amplifier 24, sometimes referred to in the art as an image intensifier is of a type well known in the art such as that available from Precise Optics of Bay Shore, N.Y., and identified by the manfacturer's model No. AD-493. The image amplifier 24 includes an input phosphor (not shown) and an output phosphor (not shown). X-rays striking the input phosphor produce electrons which are accelerated and focused on the output phosphor, resulting in the production of a visible image on the output phosphor for a predetermined length of time, e.g. much less than five milliseconds. The image amplifier normally retains a displayed image. Consequently, in connection with the present invention, the image amplifier 24 is pulsed, i.e. turned on and off, using a control signal pulse received on line 13 from the control logic 28. The control signal pulse delivered to the image amplifier 24 is depicted in FIG. 2D and is coincident in time with peak of the X-ray pulse 27 shown in FIG. 3. The waveform of the image amplifier output is designated as 35.

The resulting image on the output phosphor of the image amplifier 24 is picked up by the camera 26 which is preferably of a CCD (charge couple device) type, such as that manufactured by NEC and identified by the manufacturer's model No. T125A. The length of time of the exposure of the camera 26 to the X-ray image output by the image amplifier 24 generally depends on the rise time of the image amplifier 24, but may be, in the present example between two microseconds and 5 milliseconds. It has been discovered that by exposing the camera 26 for only a portion of the time that the X-ray image remains on the input phosphor of the image amplifier 24, a more highly focused, clearer image is recorded. The recording interval, which is depicted in FIG. 3 as being 5 milliseconds, occurs during the peak of the 8 millisecond half wave output of the image amplifier 24.

The camera 26 produces a single image field of 480 noninterlaced lines which is scanned at a standard rate of 16.6 milliseconds per field. The last three lines of each camera field are blanked out to allow transfer of the data (charges) from the camera's sensor array to the image processor 30. Even at relatively high rates of container movement, the amount of displacement of the container during each camera field is not sufficient to seriously diminish the stored image quality.

The camera 26 receives vertical and horizontal synchronization control pulses on lines 40 and 42 respectively from the image processor 30. Video signals representing each camera field are delivered on line 44 to an edge enhancer, thence to the image processor 30 for processing. The edge enhancer 32 is a conventional device such as that manufactured by For-A, and identified by the manufacturer's model No. IV-530. The edge enhancer 32 is operative to operate on the video signals received on line 44 in a manner which increases the resolution of the edges of the video image.

The image processor 30 may comprise, by way of example, a Videk, model No. 150 and is employed to process and analyze each video field recorded by the camera 26. The processor 30 includes conventional software for analyzing the video image and detecting the presence of foreign particles in the contents of the containers 10. The image processor 30 is activated by an image processor pulse shown in FIG. 2D and received from the control logic 28 on line 48. In the event that the image processor 30 detects the presence of foreign particles of the container 10, a reject signal is issued on line 46 to the control logic 28. The control logic 28 is responsive to this reject signal to issue a control signal on line 50 a conventional reject mechanism 34. The reject mechanism 34 may comprise any of various known designs and is effective to remove the container 10 having contaminants therein by displacing the container from the conveyor 12 to a lateral position 36.

The details of the control logic 28 are depicted in FIG. 4 and will be discussed in more detail later. Before discussing the control logic 28, a description of the operation of the system will now be provided and reference is concurrently made now to FIGS. 1-3. The presence of a container 10 at the inspection station 16 is detected by the photosensor 20 which produces the PIP control signal on line 38. The leading edge of the PIP control signal, which is depicted in FIG. 2B, is sensed by control logic 28. The control logic 28 also senses the line voltage (FIG. 2A) which is used to pulse the X-ray source 22. The control logic 28 produces a positive and negative clock control signal respectively corresponding to the commencement of the positive and negative half cycles of the AC line voltage, thereby keeping track of the polarity of the AC line voltage as a function of time.

Polarity sensing of the AC line voltage is important for the following reason. In connection with relatively high speed pulsing of the X-ray source 22, after the source 22 is pulsed, the core of the high voltage transformer forming part of the X-ray source 22 retains a portion of its magnetic field. Due to the high speed pulsing of the system, this excess field does not have time to dissipate sufficiently and as a result thereof when the X-ray source 22 is pulsed again, there is a delay before X-rays are generated. This delay in X-ray generation lasts until the excess field has been dissipated. The problem of excess field retention is eliminated in connection with the present system by reversing the AC current flow to the high voltage transformer on every other pulse applied to the X-ray source 22. By reversing the AC current flow, the excess field is instantly very rapidly dissipated thereby allowing immediate generation of X-rays without delay. Thus, by sensing the polarity of the AC line voltage, it is possible to alternate the current flow through the high voltage transformer in half wave segments. In connection with a 60 Hz power system, each half wave segment is approximately 8 milliseconds in duration.

Figure 2E:
Figure 2F:
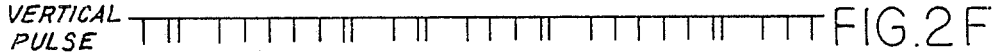
Figure 2G:
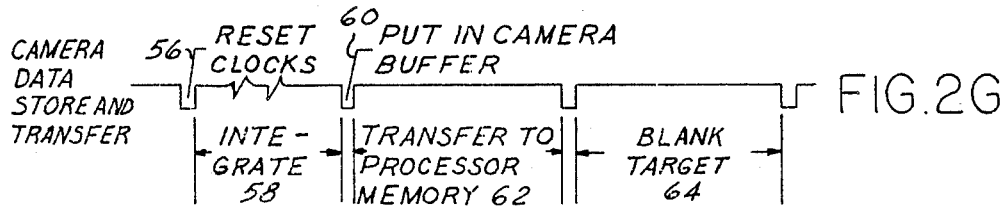
FIG. 2G is a waveform plot of The camera data storage and transfer sequence.

Thus, in the particular system illustrated herein, after the rising edge of the PIP control signal is detected, there is a zero to 1/60th second wait until the rising edge of the next positive or negative clock (depending upon the polarity of the last pulse) before the source 22 generates X-rays. As shown in FIGS. 2C-2E, the control logic 28 simultaneously delivers synchronized gating pulses to the X-ray source 22, image amplifier 24 and image processor 30, respectively on lines 52, 13 and 48.

The output phosphor of the image amplifier 24 is blanked until the gating pulse is received on line 13. As previously mentioned, the image amplifier 24 is pulsed for a duration of much less than 5 milliseconds, as shown in FIG. 3. During this latter mentioned pulse while the image is present on the output phosphor, the sensor array of the camera 26 is exposed to such image for a short, e.g., 2 milliseconds interval during that portion of the X-ray pulse when the image has the greatest intensity. The relationship of the 8 millisecond pulse and the image amplifier exposure is shown in FIG. 3.

After the pulsing of the image amplifier 24, the electrons impinging on the output phosphor are defocused, thereby blanking the output phosphor until a subsequent pulse is received by the image amplifier 24. As will be discussed later in more detail, the width of the short duration pulse supplied to the image amplifier 24 is readily adjustable using a later discussed monostable multivibrator.

As previously mentioned, the image processor 30 supplies the camera 26 with horizontal and vertical synchronizing control pulses on lines 40 and 42 respectively. These horizontal and vertical synchronizing pulses are not synchronized with the AC line current, but rather are synchronized to the independent clock of the image processor 30. When the image processor 30 receives its gate pulse on line 48 from control logic 28, the internal clock of the image processor 30 is reset and the image processor 30 in turn resets the horizontal and vertical clocks which produce the synchronizing signals on lines 40 and 42. The resetting of the horizontal and vertical clocks of the image processor 30 is depicted by the numeral 56 in FIG. 2G. As shown during the timing interval indicated by the numeral 58 in FIG. 2G, the camera 26 then integrates the image formed on the output phosphor of the image amplifier 24 for a preprogrammed time period which is typically from 5 to 250 times the horizontal clock rate. Following integration, a vertical pulse is issued at 60 in FIG. 2G during which the charges stored on the sensor array are read and placed into a buffer (not shown) forming part of the camera 26. Following the vertical pulse 60, the buffer is read line by every other line into a memory (not shown) of the image processor 30 until an image field is formed. This latter mentioned interval is designated by the numeral 62 in the timing diagram of FIG. 2G. After the formation of a complete field in the memory of the image processor 30, and the processor 30 stops receiving video information from the camera 26 and analyze to process the image. At this point the camera 26 continues to receive normal horizontal and vertical synchronizing pulses and creates a black base image on the target as indicated at 64 in FIG. 2G, until the next pulse is issued on line 13 by the control logic 28.

As previously mentioned, the video data passes from the camera 26 on line 44 through an edge enhancer 32. The edge enhancer 32 employs a high pass filter to sense steep gradients of gray scale and expands them in time.

In the event that the image processor 30 detects foreign particles or contaminants in the contents of the container 10 a command is issued on line 46 to the control logic which in turn generates a reject signal on line 50, thereby activating the reject mechanism 34 to eject the container 10 from the conveyor line 12.

Attention is now directed to FIG. 4 which depicts the details of the control logic 28 (FIG. 1). The AC line voltage employed to pulse the X-ray source 22 is converted by a pair of opto-isolators 66, 68 into a pair of clock signals respectively representing the positive and negative halves of the AC line voltage. These two clock signals are respectively delivered to the corresponding inputs of NAND gates 70 and 72 which form a part of a logic array 65. NAND gates 70 and 72 are selectively enabled by the output of a flip-flop 82. Flip-flop 82 effectively operates as a toggle in order to invert the positive or negative clock signal and disable the other. Upon disablement, the disabled one of the gates 70, 72 goes high thereby enabling NAND gate 74 which effectively inverts the clock signal which was inverted by the enabled one of the gates 70, 72. At this point, the circuit has selected either the positive or negative clock to pulse the X-ray source 22 and the circuit then waits for receipt on line 38 of the PIP signal.

The PIP control signal on line 38 sets the flip-flops 78, 80 which in turn enable the NAND gate 76, thereby inverting the selected clock signal at the output of NAND gate 76. The PIP control signal effectively forms the clock signal for flip-flop 78. On the rising edge of the PIP control signal, flip-flop 78 outputs a 1 and zero to the corresponding inputs of flip-flop 80. The outputs of flip-flop 78 do not change state until reset by a reset signal generated by a one shot 84 (monostable multivibrator). The one shot 84 is actuated by the clock control signal output from NAND gate 76.

The next rising edge of the clock signal at the output of NAND gate 74 causes flip-flop 80 to output a 1, thereby enabling NAND gate 76. Flip-flop 80 remains high until reset by the one shot 84. Enablement of NAND gate 76 effectively inverts the clock signal to its output and the inverted clock signal is inverted again by an inverter 90.

As previously mentioned the rising or back edge of the clock signal output from NAND gate 76 actuates the one shot 84 to produce a pulse which resets flip-flops 78 and 80. Disabling flip-flops 78 and 80 effectively disables the PIP signal on line 38, thereby disabling NAND gate 76. This arrangement has the effect of allowing only one pulse of the clock to be processed, which corresponds to a single half wave segment of the AC line voltage which, in the case of a 60 Hz system is 8.3 milliseconds in pulse width.

The pulse inverter by the inverter 90 enables current to flow through the LED portion of either opto-isolator 96 or 98 depending upon the state of flip-flop 82. Flip-flop 82 turns on one of the drivers 104 and 106, thereby sinking current through the corresponding opto-isolator 96, 98. Current flowing through either of the opto-isolators 96, 98 results in the firing of a corresponding SCR 100, 102 which in turn allows either a positive or negative AC half wave to energize the X-ray source 22. Upon the termination of the clock signal output by NAND gate 76 which results in the pulses shown in FIG. 2C-2E, the flip-flop 82 is toggled by the one shot 84, thereby conditioning the flip-flop 82. Toggling of the flip-flop 82 has the effect of alternately enabling the drivers 104, 106 in accordance with the polarity of the half wave of the AC line voltage.

The single pulse passing through the inverter 90 also passes through a buffer inverter 92 which fires an interface driver 94 to produce the pulse on line 48 which is delivered to the image processor 30. The pulse passing through the inverter 92 fires a one shot 86. The one shot 86 is adjustable, for example from one tenth to ten milliseconds and delivers an output pulse through a driver 88 on to line 13 which is delivered to the image amplifier 24. Adjustment of the pulse output by the one shot 86 determines the time period that the image amplifier 24 remains unblanked. From the description immediately above, it may be appreciated that the image processor 30, image amplifier 24 and X-ray source 22 are pulsed simultaneously.

From the foregoing, it is apparent that the method and apparatus of the present invention provide for the reliable accomplishment of the objects of the invention and do so in an economical manner. It is recognized, of course, that those skilled in the art may make various modifications or additions to the preferred embodiment chose to illustrate the invention without departing from the spirit and scope of the present contribution of the art. Accordingly, it is to be understood that the protection sought and to be afforded hereby should be deemed to extend to the subject matter claimed and all equivalents thereof fairly within the scope of the invention.

What is claimed is:

1. Apparatus for inspecting the contents of each of a plurality of containers continuously moving through an inspection station, comprising:

X-ray pulse generation means responsive to a first control signal for directing a pulse of X-rays through a container moving through said inspection station and resulting in the production of an X-ray image of the contents of said container for a pre-defined length of time, said X-ray image varying in amplitude as a function of time and having a peak portion occurring in time between the beginning and end of said pulse of X-rays;

image amplifying means responsive to a second control signal for amplifying said X-ray image for only said peak portion of said X-ray image to produce a substantially blurr-free optical image of said moving container;

camera means responsive to a third control signal for storing a set of optical image data representing said substantially blurr-free optical image;

image processing means coupled with said camera means for automatically analyzing said set of optical image data to ascertain the contents of said container; and, control means for generating said first, second and third control signals in synchronized relationship to each other.

2. The apparatus of claim 1, including means for detecting the presence of a container at said inspection station and for delivering an initiating control signal to said control means when a container is present at said inspection station;

said control means being responsive to said initiating control signal for generating said first and second control signals.

3. The apparatus of claim 2, wherein said detecting means includes means for directing a beam of light across the path of travel of containers moving through said inspection station and means for sensing the interruption of said light beam by a container moving through said inspection station.

4. The apparatus of claim 1, wherein said control means generates said first, second and third control signals substantially simultaneously.

5. The apparatus of claim 1, wherein said image amplifying means includes a full sine wave rectified alternating output signal related to the intensity of the amplified X-ray image and said second signal is generated during only said peak portion of each wave of said full wave rectified alternating output signal.

6. The apparatus of claim 1, wherein said X-ray pulse generation means is powered by an alternating current source of electrical power and said control means includes means for sensing the instantaneous polarity of said alternating current source and for generating said first control signal in accordance with the sensed polarity of said alternating current source.

7. The apparatus of claim 6, wherein said sensing means includes means for producing first and second clock signals respectively associated with the positive and negative polarities of said alternating current source, means for selecting one of said first and second clock signals and means for outputting said first control signal in accordance with the selected one of said first and second clock signals.

8. A method of inspecting the contents of each of a plurality of containers continuously moving through an inspection station, comprising the steps of:
(A) sensing the presence of a container moving through said inspection station;
(B) applying a pulse of X-rays of said container to produce an x-ray image of the contents of said container for a pre-defined duration of time when the presence of said container is sensed in step (A), said X-ray image varying in amplitude as a function of time and having a peak portion occurring in time between the beginning and end of said pulse of X-rays;
(C) enabling an X-ray image amplifier to amplify said X-ray image in synchronism with the application of the pulse in step (B) and during only said peak portion of said X-ray pulse while said X-ray image exists to produce a substantially blurr-free optical image of said moving container;
(D) generating in synchronism with steps (B) and (C), a set of optical image data representing said optical image produced in step (C); and
(E) analyzing the optical image data generated in step (D) to ascertain the contents of said container.

9. The method of claim 8, including the steps of:
generating a reference signal when the presence of said container is sensed in step (A);
simultaneously generating first and second control signals in response to the generation of said reference signal;
performing step (B) in response to said first control signal;
performing step (C) in response to said second control signal.

10. Apparatus for inspecting the contents of each of a plurality of articles rapidly moving past an inspection station, comprising:
means for directing a pulse of X-rays through an article moving past the inspection station and resulting in the generation of an X-ray image having an intensity which varies with time and includes a peak image intensity portion;
means for amplifying said X-ray image only during said peak intensity portion thereof;
means for analyzing the X-ray image amplified by the image amplifying means.

11. The apparatus of claim 10, wherein the analyzing means includes camera means for storing a set of image data representing the amplified X-ray image and image processing means coupled with said camera means for automatically analyzing said set of image data to determine the contents of said article.

12. The apparatus of claim 10, including control means for generating first, second and third control signals for respectively controlling said X-ray pulse means, said amplifying means and said analyzing means.

13. The apparatus of claim 12, including means for detecting the presence of an article at said inspection station and for delivering an initiating control signal to said control means when an article is present at said inspection station, said control means being responsive to said initiating control signal for generating said first and second control signals.

14. The apparatus of claim 13, wherein said detecting means includes means for directing a beam of light across the path of travel of said articles moving past said inspection station and means for sensing the interruption of said light beam by an article moving through said inspection station.

15. A method of inspecting the contents of each of a plurality of articles moving past an inspection station, comprising the steps of:
(A) sensing the presence of an article passing through said inspection station;
(B) applying a pulse of X-rays to the article at the inspection station to produce an X-ray image of said article having an intensity which varies with time and includes a peak image intensity portion;
(C) amplifying said X-ray image only during said peak intensity portion thereof; and,
(D) analyzing the X-ray image amplified in step(C) to determine the contents of said article.

* * * * *